(12) United States Patent
Miyazaki

(10) Patent No.: US 10,632,788 B2
(45) Date of Patent: Apr. 28, 2020

(54) RUBBER COMPOSITION AND PNEUMATIC TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/565,023

(22) PCT Filed: Apr. 11, 2016

(86) PCT No.: PCT/JP2016/061658
§ 371 (c)(1),
(2) Date: Oct. 6, 2017

(87) PCT Pub. No.: WO2016/171019
PCT Pub. Date: Oct. 27, 2016

(65) Prior Publication Data
US 2018/0099527 A1  Apr. 12, 2018

(30) Foreign Application Priority Data
Apr. 21, 2015 (JP) .................. 2015-087002

(51) Int. Cl.
| | | |
|---|---|---|
| B60C 1/00 | (2006.01) | |
| C08K 5/10 | (2006.01) | |
| C08K 3/06 | (2006.01) | |
| C08K 5/521 | (2006.01) | |
| C08L 33/00 | (2006.01) | |
| C08L 101/00 | (2006.01) | |
| C08L 15/00 | (2006.01) | |
| C08C 19/44 | (2006.01) | |
| C08L 21/00 | (2006.01) | |
| C08K 5/12 | (2006.01) | |
| C08K 5/52 | (2006.01) | |
| C08K 5/092 | (2006.01) | |
| C08L 33/08 | (2006.01) | |
| C08L 33/20 | (2006.01) | |

(52) U.S. Cl.
CPC .............. *B60C 1/0016* (2013.01); *B60C 1/00* (2013.01); *C08C 19/44* (2013.01); *C08K 3/06* (2013.01); *C08K 5/521* (2013.01); *C08L 15/00* (2013.01); *C08L 21/00* (2013.01); *C08L 33/00* (2013.01); *C08L 101/00* (2013.01); *C08K 5/092* (2013.01); *C08K 5/10* (2013.01); *C08K 5/12* (2013.01); *C08K 5/52* (2013.01); *C08L 33/08* (2013.01); *C08L 33/20* (2013.01)

(58) Field of Classification Search
CPC .................................. C08K 5/10; C08K 5/11
See application file for complete search history.

(56) References Cited

U.S. PATENT DOCUMENTS

| | | | | |
|---|---|---|---|---|
| 4,666,968 A | * | 5/1987 | Downey | ............ C08G 18/0842 523/173 |
| 2009/0095394 A1 | | 4/2009 | Kameda | |
| 2013/0150499 A1 | | 6/2013 | Basu et al. | |
| 2018/0105683 A1* | | 4/2018 | Miyazaki | ................ B60C 15/06 |

FOREIGN PATENT DOCUMENTS

| | | |
|---|---|---|
| CN | 1629214 A | 6/2005 |
| CN | 101407603 A | 4/2009 |
| CN | 203958686 A | 7/2014 |
| JP | 47-26432 A | 10/1972 |
| JP | 10-53004 A | 2/1998 |
| JP | 2005-307166 A | 11/2005 |
| JP | 2005-350535 A | 12/2005 |
| JP | 2007277307 A * | 10/2007 |
| JP | 2013-23568 A | 2/2013 |
| JP | 2015-34220 A | 2/2015 |
| JP | 2015-505877 A | 2/2015 |
| WO | WO 2013/086079 A1 | 6/2013 |

OTHER PUBLICATIONS

Machine translation of JP 2007-277307 A, published Oct. 25, 2007. (Year: 2007).*
International Search Report (PCT/ISA/210) issued in PCT/JP/2016/061658, dated Jun. 28, 2016.
Written Opinion of the International Searching Authority (PCT/ISA/237) issued in PCT/JP/2016/061658, dated Jun. 28, 2016.

* cited by examiner

*Primary Examiner* — Vickey Nerangis
(74) *Attorney, Agent, or Firm* — Birch, Stewart, Kolasch & Birch, LLP

(57) ABSTRACT

Provided are a rubber composition that achieves a balanced improvement in grip performance during the initial to late phases of running and abrasion resistance, and a pneumatic tire formed from the rubber composition. The present invention relates to a rubber composition containing a rubber component, sulfur, and a molten mixture of a solid resin and a plasticizer, the solid resin having an SP value of 9.2 to 13 and/or a softening point of 130° C. or higher, the plasticizer including at least one compound selected from the group consisting of phosphoric acid esters, phthalic acid esters, aliphatic polybasic acid esters, trimellitic acid esters, acetic acid esters, and ricinoleic acid esters, the solid resin being present in an amount of 1 part by mass or more per 100 parts by mass of the rubber component.

7 Claims, No Drawings

RUBBER COMPOSITION AND PNEUMATIC TIRE

TECHNICAL FIELD

The present invention relates to a rubber composition, a method for producing the rubber composition, and a pneumatic tire formed from the rubber composition.

BACKGROUND ART

Resins having a high softening point or a high SP value are generally used in racing tires and other similar tires to provide them with high grip performance during running, i.e. in high temperature conditions. However, when they are incorporated in large quantities, the hardness (Hs) at ambient temperature increases, with the result that the conformity to road surface irregularities decreases during the initial phase of the race, and thus the grip performance during the initial phase of running deteriorates.

It has also been proposed to add low temperature plasticizers such as TOP (a phosphoric acid ester) to ensure initial grip performance. In the case of diene rubber compounds such as compounds for treads, however, as the temperature increases, TOP bleeds to the rubber surface, resulting in a decrease in grip performance. This method also disadvantageously causes a deterioration in abrasion resistance.

Thus, there is a need for rubber compositions that provide good grip performance during the initial to middle and even to late phases of running while simultaneously ensuring excellent abrasion resistance.

SUMMARY OF INVENTION

Technical Problem

The present invention aims to solve the above problems and provide a rubber composition that achieves a balanced improvement in grip performance during the initial to late phases of running and abrasion resistance, and also provide a pneumatic tire formed from the rubber composition.

Solution to Problem

The present invention relates to a rubber composition, containing a rubber component, sulfur, and a molten mixture of a solid resin and a plasticizer, the solid resin having at least one of an SP value of 9.2 to 13 or a softening point of 130° C. or higher, the plasticizer including at least one compound selected from the group consisting of phosphoric acid esters, phthalic acid esters, aliphatic polybasic acid esters, trimellitic acid esters, acetic acid esters, and ricinoleic acid esters, the solid resin being present in an amount of 1 part by mass or more per 100 parts by mass of the rubber component.

The compound preferably has an SP value of 8.3 to 9.5.

The solid resin is preferably an acrylic resin having an SP value of 9.2 to 13.

Preferably, the compound has a freezing point of −50 to −10° C., and the plasticizer has a flash point of 200° C. or higher.

The plasticizer preferably includes an aliphatic polybasic acid ester.

The aliphatic polybasic acid ester is preferably bis[2-(2-butoxyethoxy)ethyl] adipate.

The rubber composition is preferably a rubber composition for treads or a rubber composition for footwear soles.

The present invention also relates to a method for producing the rubber composition, the method including:
a melting step including preparing the molten mixture of a solid resin and a plasticizer;
a base kneading step including kneading the molten mixture with the rubber component to prepare a kneaded mixture; and
a final kneading step including kneading the kneaded mixture with the sulfur.

The present invention also relates to a pneumatic tire, including a tread formed from the rubber composition.

Advantageous Effects of Invention

The rubber composition of the present invention contains a rubber component, sulfur, and a molten mixture consisting of a solid resin having a predetermined SP value and/or softening point and a plasticizer including a specific compound. Such a rubber composition achieves a balanced improvement in grip performance during the initial to late phases of running and abrasion resistance.

DESCRIPTION OF EMBODIMENTS

The rubber composition of the present invention contains a rubber component, sulfur, and a molten mixture of a solid resin having a predetermined SP value and/or softening point and a plasticizer including a specific compound. By incorporating a molten mixture obtained by previously melt mixing a specific solid resin and a plasticizer including a specific compound, the rubber composition of the present invention provides good grip performance during the initial, middle, and late phases of running while simultaneously ensuring excellent abrasion resistance, thereby achieving a balanced improvement in grip performance (during the initial, middle, and late phases of running) and abrasion resistance, as compared to rubber compositions prepared by simply mixing solid resins with plasticizers.

The reason for such effects is not clear but is presumably as follows.

When a viscous liquid (molten mixture), which is previously prepared by melting and completely dispersing a resin having a high SP value or a high softening point in a plasticizer such as a phosphoric acid ester, is kneaded with a rubber component and other components, each molecule of the resin is entangled with polymers or fillers during the kneading, and therefore its self-aggregation is reduced. According to this technique, even solid resins or other resins which are difficult to disperse can be highly dispersed in rubber. It is thus possible to reduce hardness (HS) at ambient temperature, and also to allow a stable quantity of resin to bleed to the rubber surface, thereby achieving high conformity to the road surface and good grip performance not only during the middle and late phases of running but also during the initial phase of running. Further, since the resin is highly dispersed, abrasion resistance is also improved. Therefore, the present invention achieves a balanced improvement in grip performance during the initial, middle, and late phases of running and abrasion resistance.

Non-limiting examples of the rubber component include isoprene-based rubbers such as natural rubber (NR), highly purified NR (UPNR), deproteinized NR (DPNR), epoxidized NR (ENR), and polyisoprene rubber (IR); styrene-butadiene rubber (SBR), polybutadiene rubber (BR), styrene-isoprene-butadiene rubber (SIBR), chloroprene rubber (CR), acrylonitrile butadiene rubber (NBR), and butyl rubber (IIR). Among these, in view of grip performance and abrasion resistance, SBR or BR is preferred, with SBR being more preferred.

Any styrene-butadiene rubber (SBR) may be used, and examples include emulsion polymerized SBR (E-SBR) and solution polymerized SBR (S-SBR) all of which may or may not be oil extended. Particularly in view of grip performance, oil extended high molecular weight SBR is preferred. Modified SBR such as chain end-modified S-SBR or main chain-modified S-SBR, which shows enhanced interaction with fillers, may also be suitably used. These types of SBR may be used alone or in combinations of two or more.

The modified SBR is preferably one coupled with tin or silicon, for example. The modified SBR may be produced by common coupling methods, such as by reacting the alkali metal (e.g. Li) or alkaline earth metal (e.g. Mg) of the molecular chain end of SBR to be modified with, for example, a tin halide or silicon halide.

The modified SBR is also preferably a copolymer of styrene and butadiene that contains a primary amino group or an alkoxysilyl group. The primary amino group may be bonded to any of the polymerization initiating terminal, the polymerization terminating terminal, the main chain of the polymer, and the side chain. However, it is preferably introduced to the polymerization initiating terminal or the polymerization terminating terminal in that the disappearance of energy is inhibited from the polymer terminal to be able to improve hysteresis loss characteristics.

The modified SBR may suitably be one obtained particularly by modifying the polymerizing end (active end) of solution polymerized styrene-butadiene rubber (S-SBR) with a compound represented by the formula (I) below (modified S-SBR (modified SBR disclosed in JP 2010-111753 A)). In this case, the molecular weight of the polymer can be easily controlled, and thus the amount of low molecular weight components, which increase tan δ, can be reduced. In addition, the bond between the fillers and the polymer chain can be reinforced to further improve grip performance, abrasion resistance, and other properties.

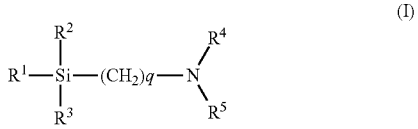

In formula (I), $R^1$, $R^2$, and $R^3$ are the same or different and each represent an alkyl group, an alkoxy group (preferably C1-C8, more preferably C1-C6, still more preferably C1-C4 alkoxy group), a silyloxy group, an acetal group, a carboxyl group (—COOH), a mercapto group (—SH), or a derivative thereof; $R^4$ and $R^5$ are the same or different and each represent a hydrogen atom or an alkyl group (preferably C1-C4 alkyl group); and q represents an integer (preferably of 1 to 5, more preferably 2 to 4, still more preferably 3).

Each of $R^1$, $R^2$, and $R^3$ is desirably an alkoxy group, and each of $R^4$ and $R^5$ is desirably an alkyl group. In such cases, excellent grip performance and excellent abrasion resistance can be obtained.

Specific examples of the compound of formula (I) include 3-aminopropyltrimethoxysilane, 3-aminopropyldimethylmethoxysilane, 3-aminopropylmethyldimethoxysilane, 2-dimethylaminoethyltrimethoxysilane, 3-diethylaminopropyltrimethoxysilane, and 3-(N,N-dimethylamino)propyltrimethoxysilane. These compounds may be used alone or in combinations of two or more.

The modification of styrene-butadiene rubber with the compound (modifier) of formula (I) may be carried out by conventional methods, such as those disclosed in JP H06-53768 B, JP H06-57767 B, and JP 2003-514078 T. For example, the modification may be accomplished by bringing styrene-butadiene rubber into contact with the modifier, e.g. as follows. After the synthesis of styrene-butadiene rubber by anionic polymerization, a predetermined amount of the modifier is added to the polymer rubber solution to react the polymerizing end (active end) of the styrene-butadiene rubber with the modifier. Alternatively, the modifier is added to a solution of styrene-butadiene rubber to react them.

The SBR preferably has a styrene content of 19% by mass or more, more preferably 21% by mass or more, still more preferably 25% by mass or more, particularly preferably 30% by mass or more. The styrene content is also preferably 60% by mass or less, more preferably 55% by mass or less, still more preferably 50% by mass or less, particularly preferably 45% by mass or less. When the styrene content is less than 19% by mass, insufficient grip performance may be obtained, while when the styrene content is more than 60% by mass, styrene groups may be located adjacent to one another so that the polymer becomes excessively hard, which can easily result in non-uniform crosslinking and therefore deteriorated durability; in addition, temperature dependence tends to increase so that larger changes in properties are obtained relative to changes in temperature, with the result that grip performance during the middle phase of running tends not to be well achieved.

The styrene content as used herein is determined by $^1$H-NMR analysis.

The SBR preferably has a vinyl content of 10% by mass or more, more preferably 20% by mass or more, still more preferably 30% by mass or more. When the vinyl content is less than 10% by mass, sufficient grip performance may not be obtained. The vinyl content is preferably 90% by mass or less, more preferably 80% by mass or less, still more preferably 70% by mass or less, particularly preferably 60% by mass or less. When the vinyl content is more than 90% by mass, such SBR is difficult to produce, and its yield may be unstable; in addition, grip performance or abrasion resistance may decrease, and thus unstable properties may be obtained.

The vinyl content (1,2-butadiene unit content) as used herein can be determined by infrared absorption spectrometry.

The SBR preferably has a glass transition temperature (Tg) of −45° C. or higher, more preferably −40° C. or higher. The Tg is preferably 10° C. or lower, more preferably 0° C. or lower.

The glass transition temperature as used herein is determined by differential scanning calorimetry (DSC) at a rate of temperature rise of 10° C./min in accordance with JIS K 7121.

The SBR preferably has a weight average molecular weight (Mw) of 200,000 or more, more preferably 300,000 or more, still more preferably 500,000 or more. The Mw is also preferably 2,000,000 or less, more preferably 1,800,000 or less. The use of SBR having a Mw of 200,000 or more can result in higher grip performance, fuel economy, durability, and abrasion resistance. An Mw of more than 2,000,000 may lead to poor filler dispersion and deteriorated durability.

The weight average molecular weight as used herein can be determined by gel permeation chromatography (GPC) (GPC-8000 series available from Tosoh Corporation, detector: differential refractometer, column: TSKGEL SUPER-MALTPORE HZ-M available from Tosoh Corporation) calibrated with polystyrene standards.

When SBR is incorporated, the amount of SBR based on 100% by mass of the rubber component is preferably 30% by mass or more, more preferably 60% by mass or more, still more preferably 80% by mass or more. When it is less than 30% by mass, grip performance tends to be insufficient. The upper limit of the amount of SBR is not particularly limited and may be 100% by mass, but is preferably 90% by mass or less when the rubber component includes SBR and other rubbers.

Any polybutadiene rubber (BR) may be used including, for example, high-cis content BR such as BR1220 available from Zeon Corporation, and BR130B and BR150B both available from Ube Industries, Ltd.; modified BR such as BR1250H available from Zeon Corporation; BR containing syndiotactic polybutadiene crystals such as VCR412 and VCR617 both available from Ube Industries, Ltd.; and BR synthesized using rare earth catalysts such as BUNA-CB25 available from Lanxess. These types of BR may be used alone or in combinations of two or more. In view of abrasion resistance, BR synthesized using rare earth catalysts (rare earth-catalyzed BR) is preferred among these.

The term "rare earth-catalyzed BR" refers to polybutadiene rubber synthesized using rare earth catalysts and characterized by high cis content and low vinyl content. The rare earth-catalyzed BR may be one commonly used in the production of tires.

The rare earth catalyst used in the synthesis of the rare earth-catalyzed BR may be a known one. Examples include catalysts containing lanthanide rare earth compounds, organoaluminum compounds, aluminoxanes, or halogen-containing compounds, optionally together with Lewis bases. Among these, neodymium (Nd) catalysts using Nd-containing compounds as lanthanide rare earth compounds are particularly preferred.

Examples of the lanthanide rare earth compounds include halides, carboxylates, alcoholates, thioalcoholates, and amides of rare earth metals of atomic numbers 57 to 71. Among these, Nd catalysts as described above are preferred because they allow the resulting BR to have high cis content and low vinyl content.

Examples of the organoaluminum compounds include compounds represented by the formula: $AlR^aR^bR^c$ wherein $R^a$, $R^b$, and $R^c$ are the same or different and each represent a hydrogen atom or a C1-C8 hydrocarbon group. Examples of the aluminoxanes include acyclic aluminoxanes and cyclic aluminoxanes. Examples of the halogen-containing compounds include aluminum halides represented by the formula: $AlX_kR^d_{3-k}$ wherein X represents a halogen atom, $R^d$ represents a C1-C20 alkyl, aryl, or aralkyl group, and k is 1, 1.5, 2, or 3; strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. Lewis bases may be used for complexation of lanthanide rare earth compounds, and suitable examples include acetylacetone, ketones, and alcohols.

In the polymerization of butadiene, the rare earth catalyst may be used in solution in an organic solvent (e.g. n-hexane, cyclohexane, n-heptane, toluene, xylene, or benzene) or may be supported on an appropriate carrier, such as silica, magnesia, or magnesium chloride. With regard to the polymerization conditions, the polymerization may be either solution polymerization or bulk polymerization, preferably at a polymerization temperature of −30 to 150° C., and the polymerization pressure may be chosen appropriately depending on other conditions.

The rare earth-catalyzed BR preferably has a cis-1,4-linkage content (cis content) of 90% by mass or more, more preferably 93% by mass or more, still more preferably 95% by mass or more. When the cis content is less than 90% by mass, durability or abrasion resistance tends to deteriorate.

The rare earth-catalyzed BR preferably has a vinyl content of 1.8% by mass or less, more preferably 1.5% by mass or less, still more preferably 1.0% by mass or less, particularly preferably 0.8% by mass or less. When the vinyl content is more than 1.8% by mass, durability or abrasion resistance tends to deteriorate.

The vinyl content (1,2-butadiene unit content) and cis content (cis 1,4-linkage content) of BR as used herein can be measured by infrared absorption spectrometry.

The amount of BR based on 100% by mass of the rubber component is preferably 0 to 40% by mass, more preferably 10 to 35% by mass. When it is more than 40% by mass, a balanced improvement in grip performance and abrasion resistance may not be achieved.

The combined amount of SBR and BR based on 100% by mass of the rubber component is preferably 80% by mass or more, more preferably 90% by mass or more, and may be 100% by mass. When it is within the range indicated above, the effects of the present invention can be better achieved.

The molten mixture according to the present invention is obtained by melt mixing a solid resin having an SP value of 9.2 to 13 and/or a softening point of 130° C. or higher with a plasticizer including at least one compound selected from the group consisting of phosphoric acid esters, phthalic acid esters, aliphatic polybasic acid esters, trimellitic acid esters, acetic acid esters, and ricinoleic acid esters.

The solid resin preferably has an SP value of 9.2 or more, more preferably 10 or more. The SP value is also preferably 13 or less, more preferably 12 or less. With an SP value falling within the range indicated above, the resin ensures compatibility with the rubber component and thus can be highly dispersed in rubber during kneading of the molten mixture.

As used herein, the SP value means a solubility parameter determined using Hansen's equation.

The solid resin preferably has a softening point of 130° C. or higher, more preferably 135° C. or higher. The softening point is also preferably 180° C. or lower, more preferably 170° C. or lower. With a softening point falling within the range indicated above, the resin can be highly dispersed in rubber during kneading of the molten mixture.

As used herein, the softening point is determined as set forth in JIS K 6220-1:2001 with a ring and ball softening point measuring apparatus and is defined as the temperature at which the ball drops down.

Any solid resin commonly used in the tire industry may be used, including, for example, coumarone-indene resins, α-methylstyrene-based resins, terpene-based resins, p-t-butylphenol acetylene resins, and acrylic resins. In order to better achieve the effects of the present invention, coumarone-indene resins, terpene-based resins, p-t-butylphenol acetylene resins, and acrylic resins are preferred among these. More preferred are acrylic resins having an SP value of 9.2 to 13.

The term "coumarone-indene resin" refers to a resin containing coumarone and indene as monomer components forming the backbone (main chain) of the resin. The backbone of the resin may contain, in addition to coumarone and indene, monomer components such as styrene, α-methylstyrene, methylindene, or vinyltoluene.

Examples of the α-methylstyrene-based resin include α-methylstyrene homopolymer and copolymers of α-methylstyrene and styrene.

Examples of the terpene-based resin include polyterpene resins, terpene phenol resins, and aromatic modified terpene resins.

The term "polyterpene resin" refers to a resin produced by polymerizing a terpene compound, or a hydrogenated product thereof. The term "terpene compound" refers to a hydrocarbon represented by the compositional formula $(C_5H_8)_n$ or an oxygen-containing derivative thereof, each of which has a terpene basic skeleton and is classified into monoterpenes $(C_{10}H_{16})$, sesquiterpenes $(C_{15}H_{24})$, diterpenes $(C_{20}H_{32})$, and other terpenes. Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resin include terpene resins made from the above-mentioned terpene compounds, such as α-pinene resin, β-pinene resin, limonene resin, dipentene resin, and β-pinene-limonene resin, and hydrogenated terpene resins obtained by hydrogenating the foregoing terpene resins.

Examples of the terpene phenol resin include resins produced by copolymerization of the above-mentioned terpene compounds and phenolic compounds, and resins obtained by hydrogenating these resins. Specific examples include resins produced by condensation of the above-mentioned terpene compounds, phenolic compounds, and formaldehyde. Such phenolic compounds include, for example, phenol, bisphenol A, cresol, and xylenol. Examples of the aromatic modified terpene resin include resins obtained by modifying terpene resins with aromatic compounds, and resins obtained by hydrogenating these resins. Any aromatic compound that has an aromatic ring may be used. Examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; styrene and styrene derivatives such as alkylstyrenes, alkoxystyrenes, and unsaturated hydrocarbon group-containing styrenes; and coumarone and indene.

The α-t-butylphenol acetylene resin may be a resin produced by a condensation reaction of p-t-butylphenol and acetylene.

Any acrylic resin may be used. The acrylic resin may suitably be a solvent-free acrylic resin in order to allow the resin to have a low impurity content and a sharp molecular weight distribution to better achieve the effects of the present invention.

Examples of the monomer components of the acrylic resin include (meth)acrylic acid and (meth)acrylic acid derivatives such as (meth)acrylic acid esters (e.g. alkyl esters, aryl esters, aralkyl esters), (meth)acrylamide, and (meth)acrylamide derivatives. The term "(meth)acrylic acid" is a general term for acrylic acid and methacrylic acid.

The monomer components of the acrylic resin may include (meth)acrylic acid or (meth)acrylic acid derivatives together with aromatic vinyls such as styrene, α-methylstyrene, vinyltoluene, vinylnaphthalene, divinylbenzene, trivinylbenzene, or divinylnaphthalene.

The acrylic resin may be formed only of a (meth)acrylic component or may further contain constituent components other than the (meth)acrylic component. In order to more suitably achieve the effects of the present invention, the acrylic resin is preferably a styrene acrylic resin (solvent-free styrene acrylic resin) containing a constituent component derived from styrene together with a (meth)acrylic component.

The acrylic resin may contain, for example, a hydroxy group, a carboxyl group, or a silanol group. It preferably contains a hydroxy group or a carboxyl group, more preferably a carboxyl group, among others, in order to more suitably achieve the effects of the present invention.

The plasticizer includes at least one compound selected from the group consisting of phosphoric acid esters, phthalic acid esters, aliphatic polybasic acid esters, trimellitic acid esters, acetic acid esters, and ricinoleic acid esters. In order to better achieve the effects of the present invention, phosphoric acid esters, phthalic acid esters, aliphatic polybasic acid esters, trimellitic acid esters, and ricinoleic acid esters are preferred among these. More preferred are phosphoric acid esters, phthalic acid esters, and aliphatic polybasic acid esters. Particularly in order to reduce the amount of phosphorus used and to achieve excellent grip performance and excellent abrasion resistance, aliphatic polybasic acid esters are preferred.

The compound preferably has an SP value of 8.3 or more, more preferably 8.6 or more. The SP value is also preferably 9.5 or less, more preferably 9.0 or less, still more preferably 8.8 or less. With an SP value falling within the range indicated above, the compound ensures compatibility with diene rubbers such as NR and SBR, with the result that excellent grip performance and excellent abrasion resistance can be obtained.

The compound preferably has a freezing point of −50° C. or higher, more preferably −40° C. or higher, still more preferably −30° C. or higher. The freezing point is also preferably −10° C. or lower, more preferably −15° C. or lower. When it is within the range indicated above, the effects of the present invention can be well achieved.

The freezing point as used herein is measured as follows.

A sample is hermetically sealed in an aluminum cell, and the aluminum cell is inserted into a sample holder of a differential scanning calorimeter (DSC-60A available from Shimadzu Corporation). Then, an endothermic peak is observed while heating the sample holder up to 150° C. at a rate of 10° C./min in a nitrogen atmosphere. The endothermic peak is defined as the freezing point.

Examples of phosphoric acid esters that can be used include known phosphoric acid ester plasticizers such as mono-, di-, or triesters of phosphoric acid with C1-C12 monoalcohols or their (poly)oxyalkylene adducts. Specific examples include tris(2-ethylhexyl)phosphate, trimethyl phosphate, triethyl phosphate, tributyl phosphate, triphenyl phosphate, tricresyl phosphate, trixylenyl phosphate, cresyl diphenyl phosphate, and 2-ethylhexyl diphenyl phosphate.

Examples of phthalic acid esters that can be used include known phthalic acid ester plasticizers such as diesters of phthalic acid with alcohols having approximately 1 to 13 carbon atoms. Specific examples include bis(2-ethylhexyl) phthalate, dimethyl phthalate, diethyl phthalate, dibutyl phthalate, diisodecyl phthalate, butyl benzyl phthalate, diisononyl phthalate, and ethyl phthalyl ethyl glycolate.

Examples of aliphatic polybasic acid esters include aliphatic dibasic acid esters and aliphatic tribasic acid esters. Among these, aliphatic dibasic acid esters such as adipic acid esters, azelaic acid esters, sebacic acid esters, maleic acid esters, and fumaric acid esters are preferred in order to better achieve the effects of the present invention.

Among these aliphatic dibasic acid esters, compounds represented by the following formula (1) can be particularly suitably used.

In formula (1), $R^{11}$ represents a saturated or unsaturated divalent hydrocarbon group, and $R^{12}$ and $R^{13}$ are the same or different and each represent a branched or unbranched alkyl group or a group represented by $—(R^{14}—O)_n—R^{15}$ where the $R^{14}$ groups, whose number is n, are the same or different and each represent a branched or unbranched alkylene group, $R^{15}$ represents a branched or unbranched alkyl group, and n represents an integer.

The saturated or unsaturated divalent hydrocarbon group for $R^{11}$ may be branched or unbranched, and examples include alkylene groups, alkenylene groups, and arylene groups. The saturated or unsaturated hydrocarbon group preferably has 1 to 10 carbon atoms, more preferably 2 to 6 carbon atoms. Specific examples of alkylene groups include methylene, ethylene, propylene, butylene, pentylene, hexylene, heptylene, octylene, nonylene, and decylene groups. Specific examples of alkenylene groups include vinylene, 1-propenylene, and 2-propenylene groups. Specific examples of arylene groups include phenylene, tolylene, and xylylene groups.

The branched or unbranched alkyl group for $R^{12}$ or $R^{13}$ preferably has 1 to 15 carbon atoms, more preferably 4 to 10 carbon atoms. Specific examples include methyl, ethyl, n-propyl, isopropyl, n-butyl, iso-butyl, sec-butyl, tert-butyl, pentyl, hexyl, heptyl, octyl, nonyl, and decyl groups.

In the group represented by $—(R^{14}—O)_n—R^{15}$ for $R^{12}$ or $R^{13}$, the branched or unbranched alkylene group for $R^{14}$ preferably has 1 to 3 carbon atoms. The branched or unbranched alkyl group for $R^{15}$ preferably has 1 to 10 carbon atoms, more preferably 2 to 6 carbon atoms. Specific examples of the alkylene group and the alkyl group may be as described above. The symbol n is preferably an integer of 1 to 10, more preferably 1 to 5, still more preferably 1 to 3.

Preferably at least one of $R^{12}$ or $R^{13}$, more preferably both, is a group represented by $—(R^{14}—O)_n—R^{15}$ because in this case, the effects of the present invention can be better achieved.

Suitable examples of the aliphatic dibasic acid ester of formula (1) include bis(alkoxyalkoxyalkyl) adipates containing the group represented by $—(R^{14}—O)_n—R^5$, such as bis[2-(2-butoxyethoxy)ethyl] adipate. Other examples include di-n-butyl adipate and diisobutyl adipate. These may be used alone or in combinations of two or more.

Examples of trimellitic acid esters that can be used include known trimellitic acid ester plasticizers such as triesters of trimellitic acid with C8-C13 saturated aliphatic alcohols. Specific examples include tri-2-ethylhexyl trimellitate, tri-n-octyl trimellitate, tridecyl trimellitate, triisodecyl trimellitate, and di-n-octyl-n-decyl trimellitate.

Examples of acetic acid esters that can be used include known acetic acid ester plasticizers such as esters of acetic acid with mono- or polyglycerin. Specific examples include glyceryl triacetate, 2-ethylhexyl acetate, and polyglycerin acetic acid esters having a degree of polymerization of polyglycerin of 2 to 4 and an acetylation rate of 50 to 100%.

Examples of ricinoleic acid esters include known ricinoleic acid ester plasticizers such as alkyl acetyl ricinoleates (alkyl group: C1 to C10) e.g. methyl acetyl ricinoleate and butyl acetyl ricinoleate.

The plasticizer may include other components in addition to the above-described compound. Such other components include, for example, known plasticizers other than the compound, and polyalkylene glycol alkyl ethers such as diethylene glycol monobutyl ether.

The concept of the "plasticizer" as used herein excludes various resins, including the above-described coumarone-indene resins, α-methylstyrene-based resins, terpene-based resins, p-t-butylphenol acetylene resins, and acrylic resins; various oils such as rubber extending oils and process oils; and liquid diene polymers.

The proportion of the compound based on 100% by mass of the plasticizer is preferably 80% by mass or more, more preferably 90% by mass or more, and may be 100% by mass. When the compound is incorporated in a proportion indicated above, the effects of the present invention can be better achieved.

Since the plasticizer possibly ignites when introduced into the Banbury mixer, it is preferred that the total plasticizer have a flash point of 200° C. or higher. For example, when the discharge temperature during kneading is set to 180° C., the maximum temperature of the rubber composition will locally reach as high as approximately 195° C. Here, with the plasticizer having a flash point of 200° C. or higher, the risk of ignition is reduced.

As used herein, the flash point of the plasticizer is determined by the Cleveland open cup method in accordance with JIS K 2265-4:2007.

The total plasticizer preferably has a weight average molecular weight (Mw) of 400 or more in order to prevent its migration to the adjacent components and to increase the flash point. The Mw is not particularly limited, but is preferably 1,000 or less. The plasticizer having a Mw of more than 1,000 may have a reduced effect in plasticizing resins and rubbers.

Examples of the plasticizer including the compound include BXA-N (bis[2-(2-butoxyethoxy)ethyl] adipate, freezing point: −19° C., flash point: 207° C., SP value: 8.70, Mw: 435), BXA-R (a mixture of bis[2-(2-butoxyethoxy)ethyl] adipate and diethylene glycol monobutyl ether (mass ratio=about 85:about 15), freezing point: −24° C., flash point: 145° C., SP value: 8.70, Mw: 394), DIDA (diisodecyl adipate, freezing point: −70° C. or lower, flash point: 229° C., SP value: 8.3, Mw: 427), DOS (bis(2-ethylhexyl) sebacate, freezing point: −62° C., flash point: 222° C., SP value: 8.5, Mw: 427), TOP (tris(2-ethylhexyl) phosphate, freezing point: −70° C. or lower, flash point: 204° C., SP value: 8.2, Mw: 435), and DOP (bis(2-ethylhexyl) phthalate, freezing point: −51° C., flash point: 218° C., SP value: 8.9, Mw: 391) all available from Daihachi Chemical Industry Co., Ltd.

The ratio by mass of the solid resin to the plasticizer (solid resin/plasticizer) in the molten mixture is preferably 10/90 to 90/10, more preferably 20/80 to 60/40, still more preferably 40/60 to 50/50. When the proportion of the solid resin is less than 10% by mass, a rubber composition in which the resin is highly dispersed may not be obtained, while when it exceeds 90% by mass, the improvements in dispersibility of the resin and in properties may decrease; in addition, the molten mixture may be difficult to take out of the mixing vessel once it is cooled, resulting in a deterioration in mass productivity.

The molten mixture can be prepared by melt dispersing the solid resin in the plasticizer, such as by mixing the solid resin and the plasticizer at a temperature equal to or higher than their melting temperatures. In particular, the molten mixture is preferably prepared by a method including adjusting (or heating) the plasticizer to give a liquid temperature at least 30° C. higher than the glass transition temperature (Tg) of the solid resin, and then successively introducing (or adding in small portions) the solid resin while maintaining the liquid temperature (at least 30° C. higher than the Tg of the solid resin), followed by dissolving the solid resin in the plasticizer with stirring. Here, the solid resin is preferably added in portions of 0.01 to 10 parts by mass, more preferably 0.1 to 5 parts by mass per 100 parts by mass of the plasticizer.

In the above method, the liquid temperature is preferably adjusted to at least 40° C. higher, more preferably at least 45° C. higher than the Tg of the solid resin. Preferably, the liquid temperature (the temperature of the mixture of the solid resin and the plasticizer) is 150 to 200° C., and the mixing time (the time for dissolving with stirring) is 2 to 6 minutes. The melt mixing can be carried out using known heaters and stirring mixers. For example, the molten mixture may be prepared by the above method while adjusting the liquid temperature, e.g. using an oil bath with, for example, silicone oil.

In the rubber composition of the present invention, the amount of the solid resin per 100 parts by mass of the rubber component is 1 part by mass or more, preferably 2 parts by mass or more, more preferably 5 parts by mass or more, still more preferably 7 parts by mass or more. If it is less than 1 part by mass, the effects of the present invention may not be achieved. The amount of the solid resin is also preferably 100 parts by mass or less, more preferably 70 parts by mass or less, still more preferably 50 parts by mass or less. An amount of more than 100 parts by mass tends to lead to reduced abrasion resistance, and also to adversely reduce initial grip performance.

In the rubber composition of the present invention, the total amount of the compound per 100 parts by mass of the rubber component is preferably 0.5 parts by mass or more, more preferably 5 parts by mass or more, still more preferably 15 parts by mass or more. When it is less than 0.5 parts by mass, the effects of the present invention may not be achieved. The total amount is also preferably 50 parts by mass or less, more preferably 40 parts by mass or less. When it is more than 50 parts by mass, grip performance or abrasion resistance may deteriorate.

In the rubber composition of the present invention, the amount of the total plasticizer including the compound, per 100 parts by mass of the rubber component, is preferably 0.5 parts by mass or more, more preferably 5 parts by mass or more, still more preferably 15 parts by mass or more. When it is less than 0.5 parts by mass, the effects of the present invention may not be achieved. The amount is also preferably 50 parts by mass or less, more preferably 40 parts by mass or less. When it is more than 50 parts by mass, grip performance or abrasion resistance may deteriorate.

In addition to the molten mixture, the solid resin, the compound, and the plasticizer may independently be further added. In this case, their amounts indicated above refer to the respective total amounts in the rubber composition.

The rubber composition of the present invention contains sulfur. Examples of the sulfur include those commonly used in the rubber industry, such as powdered sulfur, precipitated sulfur, colloidal sulfur, insoluble sulfur, highly dispersible sulfur, and soluble sulfur.

In the rubber composition of the present invention, the amount of sulfur per 100 parts by mass of the rubber component is preferably 0.4 parts by mass or more, more preferably 0.6 parts by mass or more. The amount of sulfur is also preferably 2.5 parts by mass or less, more preferably 1.8 parts by mass or less. When it is less than 0.4 parts by mass, vulcanizate hardness (Hs) or co-curing with the neighboring rubber compounds may be insufficient. When it is more than 2.5 parts by mass, abrasion resistance may deteriorate. The amount of sulfur refers to the net amount of sulfur introduced in the final kneading. For example, when insoluble sulfur (containing oil) is used, it means the net amount of sulfur, excluding the oil content.

The rubber composition of the present invention may contain carbon black in view of reinforcing properties and grip performance.

The carbon black preferably has a nitrogen adsorption specific surface area ($N_2SA$) of 100 $m^2/g$ or more, more preferably 110 $m^2/g$ or more, still more preferably 115 $m^2/g$ or more, particularly preferably 140 $m^2/g$ or more. The $N_2SA$ is also preferably 600 $m^2/g$ or less, more preferably 500 $m^2/g$ or less, still more preferably 400 $m^2/g$ or less. When it is less than 100 $m^2/g$, grip performance or abrasion resistance tends to decrease. When it is more than 600 $m^2/g$, good filler dispersion is difficult to achieve, and therefore reinforcing properties or durability tends to deteriorate. The $N_2SA$ of the carbon black is determined by the BET method in accordance with JIS K 6217-2:2001.

The amount of carbon black varies depending on the desired grip performance, abrasion resistance, or fuel economy of the tire. In order to prevent UV-induced cracking, the amount of carbon black per 100 parts by mass of the rubber component is desirably 5 parts by mass or more. When silica is used to ensure wet grip performance, the amount of carbon black per 100 parts by mass of the rubber component is preferably about 5 to 80 parts by mass. When carbon black is used to ensure dry grip performance and abrasion resistance, the amount of carbon black per 100 parts by mass of the rubber component is preferably 50 to 160 parts by mass.

The rubber composition of the present invention may contain silica. This improves rolling resistance properties while enhancing wet grip performance and reinforcing properties.

Examples of the silica include those produced by wet or dry processes.

The silica preferably has a nitrogen adsorption specific surface area ($N_2SA$) of 80 $m^2/g$ or more, more preferably 120 $m^2/g$ or more, still more preferably 150 $m^2/g$ or more. The $N_2SA$ is also preferably 280 $m^2/g$ or less, more preferably 260 $m^2/g$ or less, still more preferably 250 $m^2/g$ or less.

The $N_2SA$ of the silica is determined by the BET method in accordance with ASTM D3037-93.

When silica is incorporated, the amount of silica per 100 parts by mass of the rubber component is preferably 30 to 150 parts by mass. When it is within the range indicated above, the effects of the present invention can be better achieved.

The rubber composition containing silica preferably further contains a silane coupling agent. The silane coupling agent may be any silane coupling agent that has conventionally been used together with silica in the rubber industry.

The rubber composition of the present invention may contain at least one inorganic filler selected from the group consisting of compounds represented by the formula below, magnesium sulfate, and silicon carbide. This provides good grip performance.

In the formula, M represents at least one metal selected from the group consisting of Al, Mg, Ti, Ca, and Zr, or an oxide or hydroxide of the metal; m represents an integer of 1 to 5; x represents an integer of 0 to 10; y represents an integer of 2 to 5; and z represents an integer of 0 to 10.

Examples of the compounds of the above formula include alumina, alumina hydrate, aluminum hydroxide, magnesium hydroxide, magnesium oxide, talc, titanium white, titanium black, calcium oxide, calcium hydroxide, magnesium aluminum oxide, clay, pyrophyllite, bentonite, aluminum silicate, magnesium silicate, calcium silicate, calcium aluminum silicate, magnesium silicate, zirconium, and zirconium oxide. These inorganic compounds may be used alone or in combinations of two or more.

Preferred are inorganic fillers in which M is Al or Zr metal or an oxide or hydroxide of the metal because they have a Mohs hardness of 3 or more and show water resistance and oil resistance, and they, when processed into micron-sized particles, produce a scratching effect or they promote blooming of adhesive components which provide grip performance, thereby improving grip performance, and further because they also provide good processability, economic efficiency, and blowing resistance. More preferred is aluminum hydroxide or zirconium oxide because they are abundant and inexpensive resources. Aluminum hydroxide is particularly preferred as it further provides good kneading productivity and good extrusion processability.

The inorganic filler preferably has a nitrogen adsorption specific surface area ($N_2SA$) of 5 to 120 $m^2/g$. When the $N_2SA$ is outside the above range, grip performance decreases and abrasion resistance deteriorates. The lower limit of the $N_2SA$ is more preferably 7 $m^2/g$, while the upper limit of the $N_2SA$ is more preferably 115 $m^2/g$, still more preferably 110 $m^2/g$, particularly preferably 80 $m^2/g$, most preferably 70 $m^2/g$.

The $N_2SA$ of the inorganic filler is determined by the BET method in accordance with ASTM D3037-81.

The inorganic filler preferably has an average particle size of 1.5 μm or less, more preferably 0.69 μm or less, still more preferably 0.6 μm or less. The average particle size is also preferably 0.2 μm or more, more preferably 0.25 μm or more, still more preferably 0.4 μm or more. When it is more than 1.5 μm, grip performance may decrease and durability may deteriorate. The inorganic filler having an average particle size of less than 0.2 μm may easily form secondary aggregates in rubber, adversely resulting in reduced grip performance and deteriorated durability.

The average particle size of the inorganic filler refers to a number average particle size as measured with a transmission electron microscope.

When the inorganic filler is incorporated, the amount of the inorganic filler per 100 parts by mass of the rubber component is preferably 1 part by mass or more, more preferably 3 parts by mass or more. When it is less than 1 part by mass, grip performance (especially wet grip performance) can be insufficient. The amount is also preferably 70 parts by mass or less, more preferably 60 parts by mass or less, still more preferably 50 parts by mass or less, particularly preferably 40 parts by mass or less. An amount of more than 70 parts by mass leads to insufficient filler dispersion and therefore poor grip performance (especially poor dry grip performance) or abrasion resistance.

The rubber composition of the present invention may contain a liquid diene polymer in view of grip performance and other properties.

The term "liquid diene polymer" refers to a diene polymer that is in the liquid state at room temperature (25° C.).

The liquid diene polymer preferably has a polystyrene-equivalent weight average molecular weight (Mw) of $1.0 \times 10^3$ to $2.0 \times 10^5$, more preferably $3.0 \times 10^3$ to $1.5 \times 10^4$, as determined by gel permeation chromatography (GPC). A liquid diene polymer having a Mw of less than $1.0 \times 10^3$ may not be effective for improving grip performance and may fail to ensure sufficient durability, while a liquid diene polymer having a Mw of more than $2.0 \times 10^5$ may form an excessively viscous polymer solution, resulting in deteriorated productivity, or may reduce breaking properties.

The Mw of the liquid diene polymer as used herein is determined by gel permeation chromatography (GPC) calibrated with polystyrene standards.

Examples of the liquid diene polymer include liquid styrene-butadiene copolymers (liquid SBR), liquid polybutadiene polymers (liquid BR), liquid polyisoprene polymers (liquid IR), and liquid styrene-isoprene copolymers (liquid SIR). Among these, liquid SBR is preferred in view of grip performance during running.

When the liquid diene polymer is incorporated, the amount of the liquid diene polymer per 100 parts by mass of the rubber component is preferably 5 parts by mass or more, more preferably 10 parts by mass or more, still more preferably 20 parts by mass or more, particularly preferably 30 parts by mass or more. The amount is also preferably 120 parts by mass or less, more preferably 80 parts by mass or less, still more preferably 60 parts by mass or less. When it is less than 5 parts by mass, sufficient grip performance tends not to be obtained. When it is more than 120 parts by mass, blowing resistance tends to deteriorate.

The rubber composition of the present invention may appropriately contain, in addition to the above-described components, compounding agents commonly used in the tire industry, such as waxes, zinc oxide, stearic acid, releasing agents, antioxidants, vulcanization accelerators, and other materials.

The rubber composition of the present invention may be prepared by, for example, a method that includes: a melting step including preparing the molten mixture of a solid resin and a plasticizer; a base kneading step including kneading the molten mixture with the rubber component to prepare a kneaded mixture; and a final kneading step including kneading the kneaded mixture with the sulfur. When the molten mixture, which is previously prepared by melt mixing the solid resin with the plasticizer, is kneaded with the rubber component in the base kneading step, as described above, good grip performance can be achieved during the initial to late phases of running, and at the same time abrasion resistance can also be improved, whereby a balanced improvement in these properties can be achieved.

In the melting step, the molten mixture of a solid resin and a plasticizer may be prepared, e.g. as described above.

In the base kneading step, the molten mixture prepared in the melting step and a rubber component, and optionally other components such as carbon black, silica, a silane coupling agent, an inorganic filler, a liquid diene polymer, a wax, an antioxidant, stearic acid, and zinc oxide are kneaded. The kneading temperature and the kneading time in the base kneading step may be selected appropriately according to the mixed state, and are usually approximately at 130 to 200° C. for 1 to 15 minutes.

In the final kneading step, the kneaded mixture prepared in the base kneading step and sulfur, and optionally other components such as a vulcanization accelerator are kneaded.

The kneading temperature and the kneading time in the final kneading step may be selected appropriately according to the mixed state, and are usually approximately at 50 to 100° C. for 1 to 10 minutes.

The kneading in the base and final kneading steps may be carried out under conventional conditions using a conventional kneading machine such as a Banbury mixer, a kneader, or an open roll mill.

The rubber composition of the present invention can be used in, for example, pneumatic tires and rubbers for footwear soles. The rubber composition is suitable particularly for treads for pneumatic tires.

The pneumatic tire of the present invention can be formed from the rubber composition by usual methods.

Specifically, the rubber composition containing the components described above, before vulcanization, is extruded and processed into the shape of a tire component such as a tread and then assembled with other tire components on a tire building machine in a usual manner to build an unvulcanized tire. The unvulcanized tire is heat pressed in a vulcanizer to produce a tire.

The pneumatic tire of the present invention can be used in passenger vehicles, trucks and buses, sports cars, two-wheeled vehicles, racing vehicles, and other vehicles.

EXAMPLES

The present invention will be specifically described below with reference to, but not limited to, examples.

The chemicals used in the examples and comparative examples are listed below.
<SBR>
Modified SBR: a product prepared as described later (oil extended [oil content: 37.5 parts by mass per 100 parts by mass of rubber solids], styrene content: 41% by mass, vinyl content: 40% by mass, glass transition temperature: −29° C., weight average molecular weight: 1,190,000, SP value: 8.60)
<BR>
CB25: BUNA-CB25 (rare earth-catalyzed BR synthesized using Nd catalyst, vinyl content: 0.7% by mass, cis content: 97% by mass, glass transition temperature: −110° C., SP value: 8.20) available from Lanxess
<Filler>
HP180: HP180 (carbon black, $N_2SA$: 175 $m^2/g$, CTAB specific surface area: 181 $m^2/g$) available from Orion Engineered Carbons VN3: ULTRASIL VN3 (silica, $N_2SA$: 175 $m^2/g$) available from Evonik
<Silane Coupling Agent>
Si75: Silane coupling agent Si75 (bis(3-triethoxysilylpropyl)disulfide) available from Evonik
<Aluminum Hydroxide>
ATH #B: ATH #B (aluminum hydroxide, average particle size: 0.6 μm, $N_2SA$: 15 $m^2/g$) available from Sumitomo Chemical Co., Ltd.
<Resin>
Koresin: Koresin (p-t-butylphenol acetylene resin [condensation resin of p-t-butylphenol and acetylene], softening point: 145° C., Tg: 98° C., SPvalue: 10.8) available from BASF
T160: YS Polyester T160 (terpene phenol resin, softening point: 160° C., Tg: 100° C., SPvalue: 8.81) available fromYasuhara Chemical Co., Ltd.
C140: Coumarone-indene resin (softening point: 140° C., Tg: 65° C., SP value: 9.00) available from Rutgers Chemicals UH2170:UH2170 (hydroxy group-containing styrene acrylic resin, softening point: 80° C., Tg: 60° C., SP value: 10.5) available from Toagosei Co., Ltd.
UC3900: UC3900 (carboxyl group-containing styrene acrylic resin, softening point: 97° C., Tg: 77° C., SP value: 11.3) available from Toagosei Co., Ltd.
UC3920: UC3920 (carboxyl group-containing styrene acrylic resin, softening point: 122° C., Tg: 102° C., SP value: 11.9) available from Toagosei Co., Ltd.
M125: YS Polyester M125 (terpene-based resin, hydrogenated aromatic modified terpene resin, softening point: 125° C., Tg: 69° C., SP value: 8.52) available from Yasuhara Chemical Co., Ltd.
PX1150N: YS resin PX1150N (p-pinene resin, softening point: 115° C., Tg: 65° C., SP value: 8.26) available fromYasuhara Chemical Co., Ltd.
SA85: SYLVARES SA85 (α-methylstyrene-based resin [copolymer of α-methylstyrene and styrene], softening point: 85° C., Tg: 43° C., SP value: 9.10) available from Arizona Chemical
<Molten Mixture>
Prepared in the Preparation of molten mixture below
<Plasticizer>
BXA-N: Bis[2-(2-butoxyethoxy)ethyl] adipate (aliphatic dibasic acid ester, freezing point: −19° C., flash point: 207° C., SP value: 8.70, Mw: 435) available from Daihachi Chemical Industry Co., Ltd.
DIDA: Diisodecyl adipate (aliphatic dibasic acid ester, freezing point: −70° C. or lower, flash point: 229° C., SP value: 8.30, Mw: 427) available from Daihachi Chemical Industry Co., Ltd.
DOS: Bis(2-ethylhexyl) sebacate (aliphatic dibasic acid ester, freezing point: −62° C., flash point: 222° C., SPvalue: 8.50, Mw: 427) available from Daihachi Chemical Industry Co., Ltd.
TOP: Tris(2-ethylhexyl) phosphate (phosphoric acid ester, freezing point: −70° C. or lower, flash point: 204° C., SP value: 8.20, Mw: 435) available from Daihachi Chemical Industry Co., Ltd.
DOP: Bis(2-ethylhexyl) phthalate (phthalic acid ester, freezing point: −51° C., flash point: 218° C., SP value: 8.90, Mw: 391) available from Daihachi Chemical Industry Co., Ltd.
TOTM: Tris(2-ethylhexyl) trimellitate (trimellitic acid ester, freezing point: −30° C., flash point: 256° C., SPvalue: 9.0, Mw: 547) available from Daihachi Chemical Industry Co., Ltd.
MAR-N: Methyl acetyl ricinoleate (ricinoleic acid ester, freezing point: −30° C., flash point: 198° C., SP value: 8.5, Mw: 355) available from Daihachi Chemical Industry Co., Ltd.
<Liquid Diene Polymer>
Liquid L-SBR-820: L-SBR-820 (liquid SBR, styrene content: 20% by mass, Mw: 8,500, Tg: −14° C., SP value: about 8.5) available from Kuraray Co., Ltd.
<Antioxidant>
Wax: Ozoace 355 available from Nippon Seiro Co., Ltd.
6PPD: Antigene 6C (antioxidant, N-phenyl-N'-(1,3-dimethyl)-p-phenylenediamine) available from Sumitomo Chemical Co., Ltd.
TMQ: NOCRAC 224 (antioxidant, 2,2,4-trimethyl-1,2-dihydroquinoline polymer) available from Ouchi Shinko Chemical Industrial Co., Ltd.

<Auxiliary Agent>
Stearic acid: Stearic acid "TSUBAKI" available from NOF Corporation
Processing aid: WB16 (mixture of fatty acid metal salt (fatty acid calcium salt) and fatty acid amide) available from Struktol
Zinc oxide: Ginrei R available from Toho Zinc Co., Ltd.
<Vulcanizing Agent>
5% oil-containing powder sulfur: HK-200-5 available from Hosoi Chemical Industry Co., Ltd.
TBBS: NOCCELER NS-G (N-tert-butyl-2-benzothiazolyl-sulfenamide) available from Ouchi Shinko Chemical Industrial Co., Ltd.
ZTC: NOCCELER ZTC (zinc dibenzyldithiocarbamate) available from Ouchi Shinko Chemical Industrial Co., Ltd.
(Preparation of Chain End Modifier for SBR)
A 250 mL measuring flask in a nitrogen atmosphere was charged with 20.8 g of 3-(N,N-dimethylamino)propyltrimethoxysilane (available from AZmax. Co.) and then with anhydrous hexane (available from Kanto Chemical Co., Inc.) to give a total amount of 250 mL, whereby a chain end modifier was prepared.
(Preparation of Modified SBR)
A sufficiently nitrogen-purged 30 L pressure-resistant vessel was charged with 18 L of n-hexane, 800 g of styrene (available from Kanto Chemical Co., Inc.), 1,200 g of butadiene, and 1.1 mmol of tetramethylethylenediamine, and then the temperature was raised to 40° C. Next, 1.8 mL of 1.6 M butyllithium (available from Kanto Chemical Co., Inc.) was added to the mixture, and then the temperature was raised to 50° C., followed by stirring for three hours. Subsequently, 4.1 mL of the chain end modifier was added to the resulting mixture, followed by stirring for 30 minutes. To the reaction solution were added 15 mL of methanol and 0.1 g of 2,6-tert-butyl-p-cresol (available from Ouchi Shinko Chemical Industrial Co., Ltd.), and then 1,200 g of TDAE, followed by stirring for ten minutes. Thereafter, aggregates were recovered from the polymer solution by steam stripping. The aggregates were dried under reduced pressure for 24 hours to obtain a modified SBR.
(Preparation of Molten Mixture)
According to the formulation and the mass ratio of each molten mixture listed in Tables 1 and 2, the plasticizer was heated to 150 to 200° C. using a silicone oil bath, and the resin (solid resin) was successively introduced into the plasticizer (i.e., added in portions of 1 to 3 parts by mass per 100 parts by mass of the plasticizer) with stirring using a screw apparatus while maintaining the liquid temperature. Thus, the resin was dissolved in the plasticizer with stirring to obtain the desired molten mixture.

EXAMPLES AND COMPARATIVE EXAMPLES

According to the formulation and the kneading conditions of each example listed in Tables 1 and 2, the entire amounts of the chemicals other than the vulcanizing agents were first kneaded for five minutes at a discharge temperature of 150° C. in a 4 L Banbury mixer.
Then, the vulcanizing agents were added to the kneaded mixture, and they were kneaded for three minutes in an open roll mill to obtain an unvulcanized rubber composition. During this step, the maximum rubber temperature was 100° C.
The unvulcanized rubber composition was shaped into a tread, assembled with other tire components on a tire building machine, and press-vulcanized at 170° C. for 12 minutes to obtain a test tire (tire size: 245/40R18).
The test tires prepared as above were evaluated as follows. Tables 1 and 2 show the results.
(Initial Grip Performance)
The test tires were mounted on a front-engine, rear-wheel-drive car of 2,000 cc displacement made in Japan. A test driver drove the car 10 laps around a test track with dry asphalt road conditions and then evaluated the control stability during steering on the second lap. The results are expressed as an index (initial grip performance index), with Comparative Example 1 set equal to 100. A higher index indicates higher initial grip performance. Tires with an index of 105 or higher are considered good.
(Grip Performance During Middle Phase of Running)
The test tires were mounted on a front-engine, rear-wheel-drive car of 2,000 cc displacement made in Japan. A test driver drove the car 10 laps around a test track with dry asphalt road conditions and then compared the control stability during steering on the lap with the best lap time with that on the final lap to make an evaluation. The results are expressed as an index, with Comparative Example 1 set equal to 100. A higher index indicates a smaller deterioration in grip performance on dry roads during the middle phase of running, which means that stable grip performance during the middle phase of running is well achieved. Tires with an index of 105 or higher are considered good.
(Abrasion Resistance)
The test tires were mounted on a front-engine, rear-wheel-drive car of 2,000 cc displacement made in Japan. The car was subjected to a 500 km long run at the Okayama International Circuit in Japan. The run was carried out under dry road conditions at a road temperature of 20 to 30° C.
After the run, the remaining groove depth in the tire tread rubber (initial depth: 8.0 mm) was measured to evaluate abrasion resistance. A larger average depth of the remaining main grooves indicates better abrasion resistance. The remaining groove depths are expressed as an index, with Comparative Example 1 set equal to 100. A higher index indicates better abrasion resistance.

TABLE 1

|   |   |   | Ex. 1 | Ex. 2 | Ex. 3 | Com. Ex. 1 | Com. Ex. 2 | Ex. 4 | Com. Ex. 3 | Ex. 5 | Com. Ex. 4 | Ex. 6 |
|---|---|---|---|---|---|---|---|---|---|---|---|---|
| Formulation (parts by mass) | SBR | Modified SBR | 137.5 | 137.5 | 137.5 | 137.5 | 137.5 | 137.5 | 137.5 | 137.5 | 137.5 | 137.5 |
|  | Filler | HP180 | 115 | 115 | 115 | 115 | 115 | 115 | 115 | 115 | 115 | 115 |
|  | Aluminum hydroxide | ATH#B | 5 | 5 | 5 | 5 | 5 | 5 | 5 | 5 | 5 | 5 |
|  | Resin | Koresin | 30 |  |  | 30 | 30 | 30 | 30 |  |  |  |
|  |  | T160 |  |  |  |  |  |  |  |  | 30 |  |
|  |  | C140 |  |  |  |  |  |  |  |  |  |  |
|  |  | UH2170 |  |  |  |  |  |  |  |  |  |  |
|  |  | UC3900 |  | 5 | 0 |  |  | 5 | 0 |  |  |  |

TABLE 1-continued

| | | | | | | | | | | | | |
|---|---|---|---|---|---|---|---|---|---|---|---|---|
| | | UC3920 | | | | | | | 5 | | | |
| | | M125 | 10 | 10 | 10 | 10 | 10 | 10 | 10 | 10 | 10 | 10 |
| Molten mixture (solid resin/ plasticizer) | | Koresin/BXA-N (mass ratio 50:50) | | 60 | 60 | | | | | | | |
| | | T160/BXA-N (mass ratio 50:50) | | | | | | | | 60 | | |
| | | C140/BXA-N (mass ratio 50:50) | | | | | | | | | | 60 |
| | | UH2170/BXA-N (mass ratio 50:50) | | | | | | | | | | |
| | | UC3900/BXA-N (mass ratio 50:50) | 10 | | | | | | | | | |
| | | UC3920/BXA-N (mass ratio 50:50) | | | | | | | 10 | | | |
| | | M125/BXA-N (mass ratio 50:50) | | | | | | | | | | |
| | | PX1150N/BXA-N (mass ratio 50:50) | | | | | | | | | | |
| | | SA85/BXA-N (mass ratio 50:50) | | | | | | | | | | |
| Plasticizer | | TOP | 25 | | | 30 | 30 | 25 | 30 | | 35 | |
| Liquid diene polymer | | Liquid L-SBR820 | 40 | 40 | 45 | 40 | 40 | 40 | 40 | 45 | 40 | 45 |
| Antioxidant | | Wax | 1.5 | 1.5 | 1.5 | 1.5 | 1.5 | 1.5 | 1.5 | 1.5 | 1.5 | 1.5 |
| | | 6PPD | 3 | 3 | 3 | 3 | 3 | 3 | 3 | 3 | 3 | 3 |
| | | TMQ | 1 | 1 | 1 | 1 | 1 | 1 | 1 | 1 | 1 | 1 |
| Auxiliary agent | | Stearic acid | 3 | 3 | 3 | 3 | 3 | 3 | 3 | 3 | 3 | 3 |
| | | Processing aid | 1 | 1 | 1 | 1 | 1 | 1 | 1 | 1 | 1 | 1 |
| | | Zinc oxide | 2.5 | 2.5 | 2.5 | 2.5 | 2.5 | 2.5 | 2.5 | 2.5 | 2.5 | 2.5 |
| Vulcanizing agent | | 5% oil-containing powder sulfur | 1.1 | 1.1 | 1.1 | 1.1 | 1.1 | 1.1 | 1.1 | 1.1 | 1.1 | 1.1 |
| | | TBBS | 4.0 | 4.0 | 4.0 | 4.0 | 4.0 | 4.0 | 4.0 | 4.0 | 4.0 | 4.0 |
| | | ZTC | 2 | 2 | 2 | 2 | 2 | 2 | 2 | 2 | 2 | 2 |
| Tire properties | | Initial grip performance (target ≥ 105) | 112 | 110 | 107 | 100 | 100 | 108 | 95 | 105 | 96 | 105 |
| | | Grip performance during middle phase of running (target ≥ 105) | 115 | 109 | 107 | 100 | 90 | 113 | 102 | 105 | 92 | 106 |
| | | Abrasion resistance (target ≥ 100) | 104 | 102 | 111 | 100 | 103 | 101 | 96 | 112 | 104 | 110 |
| | | Overall properties (average of three properties) (target ≥ 105) | 110 | 107 | 108 | 100 | 98 | 107 | 98 | 107 | 97 | 107 |

| | | | Com. Ex. 5 | Ex. 7 | Com. Ex. 6 | Ex. 8 | Com. Ex. 7 | Com. Ex. 8 | Com. Ex. 9 | Com. Ex. 10 |
|---|---|---|---|---|---|---|---|---|---|---|
| Formulation (parts by mass) | SBR | Modified SBR | 137.5 | 137.5 | 137.5 | 137.5 | 137.5 | 137.5 | 137.5 | 137.5 |
| | Filler | HP180 | 115 | 115 | 115 | 115 | 115 | 115 | 115 | 115 |
| | Aluminum hydroxide | ATH#B | 5 | 5 | 5 | 5 | 5 | 5 | 5 | 5 |
| | Resin | Koresin | | 30 | 30 | | 30 | 30 | 30 | 30 |
| | | T160 | | | | | | | | |
| | | C140 | 30 | | | | | | | |
| | | UH2170 | | | | 5 | | | | |
| | | UC3900 | | | | | | | | |
| | | UC3920 | | | | | | | | |
| | | M125 | 10 | 10 | 10 | 10 | 20 | 0 | 0 | 0 |
| Molten mixture (solid resin/ plasticizer) | | Koresin/BXA-N (mass ratio 50:50) | | | | | 60 | | | |
| | | T160/BXA-N (mass ratio 50:50) | | | | | | | | |
| | | C140/BXA-N (mass ratio 50:50) | | | | | | | | |
| | | UH2170/BXA-N (mass ratio 50:50) | | | 10 | | | | | |
| | | UC3900/BXA-N (mass ratio 50:50) | | | | 10 | | | | |
| | | UC3920/BXA-N (mass ratio 50:50) | | | | | | | | |
| | | M125/BXA-N (mass ratio 50:50) | | | | | | | 40 | |
| | | PX1150N/BXA-N (mass ratio 50:50) | | | | | | | | 40 |
| | | SA85/BXA-N (mass ratio 50:50) | | | | | | | | 40 |

TABLE 1-continued

| | | | | | | | | | | |
|---|---|---|---|---|---|---|---|---|---|---|
| | Plasticizer | TOP | 35 | 25 | 30 | | 20 | 5 | 5 | 5 |
| | Liquid diene polymer | Liquid L-SBR820 | 40 | 40 | 40 | 40 | 45 | 40 | 40 | 40 |
| | Antioxidant | Wax | 1.5 | 1.5 | 1.5 | 1.5 | 1.5 | 1.5 | 1.5 | 1.5 |
| | | 6PPD | 3 | 3 | 3 | 3 | 3 | 3 | 3 | 3 |
| | | TMQ | 1 | 1 | 1 | 1 | 1 | 1 | 1 | 1 |
| | Auxiliary agent | Stearic acid | 3 | 3 | 3 | 3 | 3 | 3 | 3 | 3 |
| | | Processing aid | 1 | 1 | 1 | 1 | 1 | 1 | 1 | 1 |
| | | Zinc oxide | 2.5 | 2.5 | 2.5 | 2.5 | 2.5 | 2.5 | 2.5 | 2.5 |
| | Vulcanizing agent | 5% oil-containing powder sulfur | 1.1 | 1.1 | 1.1 | 1.1 | 1.1 | 1.1 | 1.1 | 1.1 |
| | | TBBS | 4.0 | 4.0 | 4.0 | 4.0 | 4.0 | 4.0 | 4.0 | 4.0 |
| | | ZTC | 2 | 2 | 2 | 2 | 2 | 2 | 2 | 2 |
| Tire properties | | Initial grip performance (target ≥ 105) | 93 | 107 | 95 | 128 | 108 | 109 | 104 | 97 |
| | | Grip performance during middle phase of running (target ≥ 105) | 91 | 107 | 95 | 126 | 101 | 102 | 90 | 83 |
| | | Abrasion resistance (target ≥ 100) | 105 | 104 | 99 | 110 | 107 | 108 | 105 | 92 |
| | | Overall properties (average of three properties) (target ≥ 105) | 96 | 106 | 96 | 121 | 105 | 106 | 100 | 91 |

TABLE 2

| | | | Ex. 1 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|
| Formulation (parts by mass) | SBR | Modified SBR | 137.5 | 137.5 | 137.5 | 137.5 | 137.5 | 137.5 | 137.5 | 137.5 | 137.5 | 137.5 | 137.5 |
| | BR | CB25 | | | | | | | | | | | |
| | Filler | HP180 | 115 | 115 | 115 | 115 | 115 | 115 | 115 | 115 | 115 | 115 | 115 |
| | | VN3 | | | | | | | | | | | |
| | Silane coupling agent | Si75 | | | | | | | | | | | |
| | Aluminum hydroxide | ATH#B | 5 | 5 | 5 | 5 | 5 | 5 | 5 | 5 | 5 | 5 | 5 |
| | Resin | Koresin | 30 | 30 | 30 | 30 | 30 | 30 | 30 | 30 | 30 | 30 | 30 |
| | | M125 | 10 | 10 | 10 | 10 | 10 | 10 | 10 | 10 | 10 | 10 | 10 |
| | Molten mixture (solid resin/ plasticizer) | Koresin/BXA-N (mass ratio 50:50) | | | | | | | | | | | |
| | | UC3900/BXA-N (mass ratio 50:50) | 10 | | | | | | | 10 | | 10 | |
| | | UC3920/BXA-N (mass ratio 50:50) | | | | | | | | | | 10 | 10 |
| | | UC3900/DIDA (mass ratio 50:50) | | 10 | | | | | | | | | |
| | | UC3900/DOS (mass ratio 50:50) | | | 10 | | | | | | | | |
| | | UC3900/TOP (mass ratio 50:50) | | | | 10 | | | | | | | |
| | | UC3900/DOP (mass ratio 50:50) | | | | | 10 | | | | | | |
| | | UC3900/BXA-N (mass ratio 70:30) | | | | | | 7.1 | | | | | |
| | | UC3900/BXA-N (mass ratio 30:70) | | | | | | | 16.7 | | | | |
| | | UC3900/TOTM (mass ratio 50:50) | | | | | | | | | | | |
| | | UC3900/MAR-N (mass ratio 50:50) | | | | | | | | | | | |
| | Plasticizer | BXA-N | | | | | | | | 25 | 25 | | |
| | | DOS | | | | | | | | | | 25 | 25 |
| | | TOP | 25 | 25 | 25 | 25 | 25 | 27.9 | 18.3 | | | | |
| | Liquid diene polymer | Liquid L-SBR820 | 40 | 40 | 40 | 40 | 40 | 40 | 40 | 40 | 40 | 40 | 40 |
| | Antioxidant | Wax | 1.5 | 1.5 | 1.5 | 1.5 | 1.5 | 1.5 | 1.5 | 1.5 | 1.5 | 1.5 | 1.5 |
| | | 6PPD | 3 | 3 | 3 | 3 | 3 | 3 | 3 | 3 | 3 | 3 | 3 |
| | | TMQ | 1 | 1 | 1 | 1 | 1 | 1 | 1 | 1 | 1 | 1 | 1 |
| | Auxiliary agent | Stearic acid | 3 | 3 | 3 | 3 | 3 | 3 | 3 | 3 | 3 | 3 | 3 |
| | | Processing aid | 1 | 1 | 1 | 1 | 1 | 1 | 1 | 1 | 1 | 1 | 1 |
| | | Zinc oxide | 2.5 | 2.5 | 2.5 | 2.5 | 2.5 | 2.5 | 2.5 | 2.5 | 2.5 | 2.5 | 2.5 |
| | Vulcanizing agent | 5% oil-containing powder sulfur | 1.1 | 1.1 | 1.1 | 1.1 | 1.1 | 1.1 | 1.1 | 1.1 | 1.1 | 1.1 | 1.1 |

TABLE 2-continued

|  |  |  |  |  |  |  |  |  |  |  |  |
|---|---|---|---|---|---|---|---|---|---|---|---|
|  | TBBS |  | 4.0 | 4.0 | 4.0 | 4.0 | 4.0 | 4.0 | 4.0 | 4.0 | 4.0 | 4.0 | 4.0 |
|  | ZTC |  | 2 | 2 | 2 | 2 | 2 | 2 | 2 | 2 | 2 | 2 | 2 |
| Tire properties | Initial grip performance (target ≥ 105) |  | 112 | 110 | 110 | 109 | 110 | 109 | 113 | 113 | 110 | 111 | 109 |
|  | Grip performance during middle phase of running (target ≥ 105) |  | 115 | 109 | 111 | 108 | 110 | 112 | 112 | 117 | 116 | 110 | 113 |
|  | Abrasion resistance (target ≥ 100) |  | 104 | 102 | 102 | 101 | 104 | 102 | 104 | 106 | 103 | 102 | 100 |
|  | Overall properties (average of three properties) (target ≥ 105) |  | 110 | 107 | 108 | 106 | 108 | 108 | 110 | 112 | 110 | 108 | 107 |

|  |  |  | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|---|---|
| Formulation (parts by mass) | SBR | Modified SBR | 137.5 | 137.5 | 137.5 | 137.5 | 137.5 | 110 | 137.5 | 137.5 | 137.5 |
|  | BR | CB25 |  |  |  |  |  | 20 |  |  |  |
|  | Filler | HP180 | 115 | 115 | 135 | 115 | 60 | 115 | 135 | 115 | 115 |
|  |  | VN3 |  |  |  |  | 60 |  |  |  |  |
|  | Silane coupling agent | Si75 |  |  |  |  | 4.8 |  |  |  |  |
|  | Aluminum hydroxide | ATH#B | 0 | 5 | 5 | 5 | 30 | 15 | 0 | 5 | 5 |
|  | Resin | Koresin | 15 | 33 |  |  | 30 | 30 |  | 30 | 30 |
|  |  | M125 | 20 | 10 | 10 | 10 | 10 | 10 | 10 | 10 | 10 |
|  | Molten mixture (solid resin/ plasticizer) | Koresin/BXA-N (mass ratio 50:50) |  |  | 60 | 60 |  |  | 60 |  |  |
|  |  | UC3900/BXA-N (mass ratio 50:50) | 40 | 4 | 10 | 10 | 10 | 10 | 10 |  |  |
|  |  | UC3920/BXA-N (mass ratio 50:50) |  |  |  |  |  |  |  |  |  |
|  |  | UC3900/DIDA (mass ratio 50:50) |  |  |  |  |  |  |  |  |  |
|  |  | UC3900/DOS (mass ratio 50:50) |  |  |  |  |  |  |  |  |  |
|  |  | UC3900/TOP (mass ratio 50:50) |  |  |  |  |  |  |  |  |  |
|  |  | UC3900/DOP (mass ratio 50:50) |  |  |  |  |  |  |  |  |  |
|  |  | UC3900/BXA-N (mass ratio 70:30) |  |  |  |  |  |  |  |  |  |
|  |  | UC3900/BXA-N (mass ratio 30:70) |  |  |  |  |  |  |  |  |  |
|  |  | UC3900/TOTM (mass ratio 50:50) |  |  |  |  |  |  |  | 10 |  |
|  |  | UC3900/MAR-N (mass ratio 50:50) |  |  |  |  |  |  |  |  | 10 |
|  | Plasticizer | BXA-N |  |  |  |  |  |  |  |  |  |
|  |  | DOS |  |  |  |  |  |  |  |  |  |
|  |  | TOP | 10 | 28 |  |  | 25 | 25 |  | 25 | 25 |
|  | Liquid diene polymer | Liquid L-SBR820 | 35 | 40 | 40 | 50 | 40 | 50 | 40 | 40 | 40 |
|  | Antioxidant | Wax | 1.5 | 1.5 | 1.5 | 1.5 | 1.5 | 1.5 | 1.5 | 1.5 | 1.5 |
|  |  | 6PPD | 3 | 3 | 3 | 3 | 3 | 3 | 3 | 3 | 3 |
|  |  | TMQ | 1 | 1 | 1 | 1 | 1 | 1 | 1 | 1 | 1 |
|  | Auxiliary agent | Stearic acid | 3 | 3 | 3 | 3 | 3 | 3 | 3 | 3 | 3 |
|  |  | Processing aid | 1 | 1 | 1 | 1 | 1 | 1 | 1 | 1 | 1 |
|  |  | Zinc oxide | 2.5 | 2.5 | 2.5 | 2.5 | 2.5 | 2.5 | 2.5 | 2.5 | 2.5 |
|  | Vulcanizing agent | 5% oil-containing powder sulfur | 1.1 | 1.1 | 1.1 | 1.1 | 1.1 | 1.1 | 1.1 | 1.1 | 1.1 |
|  |  | TBBS | 4.0 | 4.0 | 4.0 | 4.0 | 4.0 | 4.0 | 4.0 | 4.0 | 4.0 |
|  |  | ZTC | 2 | 2 | 2 | 2 | 2 | 2 | 2 | 2 | 2 |
| Tire properties | Initial grip performance (target ≥ 105) |  | 105 | 105 | 133 | 135 | 120 | 106 | 128 | 107 | 109 |
|  | Grip performance during middle phase of running (target ≥ 105) |  | 124 | 106 | 133 | 126 | 106 | 105 | 125 | 107 | 110 |
|  | Abrasion resistance (target ≥ 100) |  | 101 | 104 | 107 | 103 | 100 | 116 | 110 | 101 | 102 |
|  | Overall properties (average of three properties) (target ≥ 105) |  | 110 | 105 | 124 | 121 | 109 | 109 | 121 | 105 | 107 |

Tables 1 and 2 demonstrate that in the examples using a sulfur-containing rubber composition containing a previously prepared molten mixture which consisted of a solid resin having a predetermined SP value or softening point and a plasticizer including a specific compound, the targeted initial grip performance, grip performance during the middle phase of running, and abrasion resistance were all achieved, and thus a balanced improvement in these properties was achieved.

In particular, comparisons between Examples 1 and 9 to 12, and between Examples 15, 1, and 17 demonstrate that the use of BXA-N not only as the plasticizer of the molten mixture but also as an additional plasticizer incorporated in addition to the molten mixture resulted in a more balanced improvement in the properties compared to other plasticizers.

Moreover, by comparing Example 1 vs. Comparative Example 1, Example 2 vs. Comparative Example 2, Example 4 vs. Comparative Example 3, and Comparative Example 7 vs. Comparative Example 8, it is demonstrated that when Koresin, UC3900, or UC3920 having both a larger SP value and a higher Tg was used as the solid resin of the molten mixture, the previously prepared molten mixture was more effective for improving the balance of the properties.

The invention claimed is:

1. A method for producing a rubber composition, the method comprising:
   a melting step including preparing a molten mixture of a solid resin and a plasticizer;
   a base kneading step including kneading the molten mixture with a rubber component to prepare a kneaded mixture; and
   a final kneading step including kneading the kneaded mixture with a sulfur to obtain said rubber composition,
   wherein the solid resin has at least one of an SP value of 10.5 to 11.9 or a softening point of 140 to 160° C.,
   the plasticizer includes at least one compound selected from the group consisting of phosphoric acid esters, phthalic acid esters, aliphatic polybasic acid esters, trimellitic acid esters, acetic acid esters, and ricinoleic acid esters,
   wherein the plasticizer has a flash point of 200° C. or higher, and
   the compound has a freezing point of −30 to −19° C., and
   the solid resin is present in an amount of 1 part by mass or more per 100 parts by mass of the rubber component.

2. The method for producing the rubber composition according to claim 1,
   wherein the compound has an SP value of 8.3 to 9.5.

3. The method for producing the rubber composition according to claim 1,
   wherein the solid resin is an acrylic resin having an SP value of 10.5 to 11.9.

4. The method for producing the rubber composition according to claim 1,
   wherein the plasticizer includes an aliphatic polybasic acid ester.

5. The method for producing the rubber composition according to claim 4,
   wherein the aliphatic polybasic acid ester is bis[2-(2-butoxyethoxy)ethyl] adipate.

6. The method for producing the rubber composition according to claim 1,
   wherein the rubber composition is a rubber composition for treads or a rubber composition for footwear soles.

7. A method for producing a pneumatic tire, the method comprising a forming step including forming a tread from the rubber composition obtained by the method for producing the rubber composition according to claim 1.

* * * * *